United States Patent [19]

Ambrosius, III et al.

[11] Patent Number: 4,649,474

[45] Date of Patent: Mar. 10, 1987

[54] CHIP TOPOGRAPHY FOR A MOS DISK MEMORY CONTROLLER CIRCUIT

[75] Inventors: William H. Ambrosius, III, Mission Viejo; Larry D. Rossean, Westminster, both of Calif.

[73] Assignee: Western Digital Corporation, Irvine, Calif.

[21] Appl. No.: 535,374

[22] Filed: Sep. 23, 1983

[51] Int. Cl.$^4$ .......................... G06Z 1/00; G06Z 13/00
[52] U.S. Cl. ..................................................... 364/200
[58] Field of Search ... 364/200 MS File, 900 MS File; 357/45

[56] References Cited

U.S. PATENT DOCUMENTS

| | | | |
|---|---|---|---|
| 4,393,464 | 7/1983 | Knapp et al. | 364/900 |
| 4,525,801 | 6/1985 | Kuwabara | 364/900 |
| 4,527,233 | 7/1985 | Ambrosius et al. | 364/200 |
| 4,549,262 | 10/1985 | Chung et al. | 364/200 |

Primary Examiner—James D. Thomas
Assistant Examiner—Thomas C. Lee
Attorney, Agent, or Firm—Spensley Horn Jubas & Lubitz

[57] ABSTRACT

An improved chip topography for a disk memory controller circuit is provided which includes chip buffer circuitry disposed around the periphery of the chip wherein the chip buffer circuitry forms a quadrilateral outer framework on the chip and data I/O buffer circuitry forms a first side of the quadrilateral outer framework; data I/O buffer control circuitry disposed between first and second corners of the chip buffer circuitry and adjacent to the data I/O buffer circuitry; a microcontroller for regulating the functions of the disk memory controller chip wherein a first portion of the microcontroller is disposed adjacent to the data I/O buffer control circuitry and along a part of a second side of the chip buffer circuitry; drive control and unit select registers coupled to the microcontroller and the chip buffer circuitry, and disposed adjacent to the first portion of the microcontroller and along part of a third side and within a third corner of the chip buffer circuitry, said microcontroller further comprising a second portion disposed adjacent to the first portion of the microcontroller and within a third corner and along a part of the third side of the chip buffer circuitry; a read-only-memory (ROM) disposed adjacent to the second portion of the microcontroller along a part of a fourth side of the chip buffer circuitry, said microcontroller further comprising a third portion which is disposed adjacent to the ROM and along a part of the fourth side of the chip buffer circuitry; disk synchronization circuitry disposed adjacent to the third portion of the microcontroller and along a part of the fourth side of the chip buffer circuitry; shift registers disposed adjacent to the disk synchronization circuitry and the third portion of the microcontroller; error checking circuitry disposed adjacent to and between the first and third portions of the microcontroller and also disposed adjacent to the data I/O buffer control circuitry; and a register file disposed adjacent to and between the first and third portions of the microcontroller and also disposed adjacent to the error checking circuitry.

14 Claims, 12 Drawing Figures

Fig. 2A

| HEAD SCATTER | PLO SYNC | SYNC CHAR | ID FIELD | WRITE SPLICE | PLO SYNC | SYNC CHAR | DATA | CRC 1 | CRC 2 | END OF RECORD | END OF SECTOR |
|---|---|---|---|---|---|---|---|---|---|---|---|
| 16 BYTES | 11 BYTES | 1 BYTE | 6 BYTES | 2 BYTES | 11 BYTES | 1 BYTE | 128 TO 1024 BYTES | 1 BYTE | 1 BYTE | 2 BYTE | 7 BYTES (MIN) |
| "00" | "00" | "FE" | | "00" | "00" | "FE" | | | | "00" | "00" |

DATA FIELD

Fig. 2B  ID FIELD

| UPPER CYL ADDR | LOWER CYL ADDR | HEAD | SECTOR ADDR | CRC 1 | CRC 2 |
|---|---|---|---|---|---|
| 1 BYTE | 1 BYTE | 1 BYTE | 1 BYTE | 1 BYTE | 1 BYTE |

CHIP TOPOGRAPHY FOR A MOS DISK MEMORY CONTROLLER CIRCUIT

BACKGROUND OF THE INVENTION

The present invention is directed to disk memory controller circuits and more particularly, to the topographical layout of disk memory controller circuits which are integrated on semiconductor chips.

A disk memory is a large capacity memory in which digital data is stored on one or more rotating disks. Each disk is usually coated with a ferro-magnetic material. Data is written on the disk by passing a current through a coil in a read/write head positioned adjacent the disk. The current through the coil magnetizes a small area on the disk. The size of the magnetized area generally depends upon the speed of rotation of the disk and the duration of the writing current. To read the data stored on a disk, the coil of the read/write head is used as a sense winding. The movement of a magnetized area under the head induces a voltage in the coil which is sensed by a sense amplifier.

A disk memory controller circuit is provided to control the motion of the head in order to read or write data at a particular location on the disk. In addition, the data to be written on or read from the disk is typically transmitted through the disk controller circuit.

Data to be stored in a disk memory is often stored first in a buffer memory by the central processing unit (CPU) of the computer system. The data is then read from the buffer memory by the disk memory controller circuit and written onto the disk at the disk memory location specified by the CPU. Conversely, in read operations, data read from the disk memory at a location specified by the CPU is transferred by the disk memory controller circuit to the buffer memory. In some systems, data transfers can be made directly from and to the memory of the computer system in "direct-memory-access" operations by the disk memory controller circuit.

However, merely designing a circuit to perform these functions is not sufficient to insure that such a circuit will be economical to manufacture as a metal oxide semiconductor (MOS) large scale integrated (LSI) circuit chip. A primary consideration in the economical manufacture of MOS LSI circuits is minimizing the amount of substrate material (such as silicon) required to produce an integrated circuit chip, thus allowing a greater chip yield per substrate wafer.

The surface geometry of the MOS devices formed on the chips and the interconnection pattern of conductors therebetween must be optimized to provide the highest functional component density in order to reduce overall chip area per circuit function. Minimum geometry spacings between metallization lines, diffused regions, and polycrystalline silicon conductors must be maintained, yet the length of such lines and their associated capacitances must be minimized in order to optimize circuit performance as the complex interconnection patterns are implemented. Parasitic electrical effects on the circuitry also must be minimized or compensated for in the chip layout. A very high degree of creativeness is thus required of the chip architect in order to choose a particular layout and interconnection pattern for an LSI circuit from the very large number of possibilities that exist for arranging such a circuit. Frequently, the commercial success of a MOS LSI product may hinge on the ability of a chip architect to achieve an optimum chip topography.

By creatively structuring the topographic layout of the disk memory controller circuit chip, the present invention allows a MOS LSI chip size of 238.2 mils by 245.2 mils, with a processing speed of up to 10 megabits per second, or even more. A preferred embodiment of the present invention is fabricated in N-channel, self-aligned silicon gate MOS technology, and is transistor-transistor logic (TTL) compatible on all inputs and outputs.

It is therefore an object of this invention to provide an optimum chip topography for a MOS LSI disk memory controller circuit.

SUMMARY OF THE INVENTION

The topography design of the present invention minimizes the amount of substrate material required for each integrated circuit chip by optimizing the size-limiting parameters common to MOS processing technology. A preferred embodiment of the present invention is directed to a hard disc memory controller (hereinafter often referred to as the "HDC"). The HDC chip topography developed includes buffer circuitry disposed around the periphery of the chip and forming an approximately quadrilateral framework surrounding the remainder of the circuitry wherein a first side of this quadrilateral framework is formed by data I/O buffers; data I/O buffer control circuitry is disposed adjacent to the data I/O buffers along the first side and within a first and a second corner of the buffer circuitry; a first portion of a microcontroller is disposed adjacent to the data I/O buffer control circuitry and along part of a second side of the buffer circuitry; drive control and unit select ports are disposed adjacent to the first portion of the microcontroller and along a part of a third side and within a third corner of the buffer circuitry; a second portion of the microcontroller is disposed adjacent to the first portion of the microcontroller and the drive control and unit select ports and within a fourth corner of the buffer circuitry; a ROM is disposed adjacent to the second portion of the microcontroller and along a part of a fourth side of the buffer circuitry; a third portion of the microcontroller is disposed adjacent to the ROM and along a part of the fourth side of the buffer circuitry; disk synchronization circuitry is disposed adjacent to the third portion of the microcontroller and along a part of the fourth side of the buffer circuitry; disk data shifting registers are disposed adjacent to and between the synchronization circuitry and the data I/O buffer control circuitry and along a part of the fourth side of the buffer circuitry; error checking circuitry is disposed adjacent to and between the first and third portions of the microcontroller and also adjacent to the data I/O buffer control circuitry; and a register file is disposed adjacent to and between the first and third portions of the microcontroller and also adjacent to the error checking circuitry.

In another aspect of the present invention, the microcontroller has several subcircuits for implementing the functions of the microcontroller. The topography design of the microcontroller for the HDC chip comprises a first portion which includes host processor data transfer control logic disposed adjacent to the error checking circuitry and the buffer control circuitry along a part of the second side of the buffer circuitry; register file address decode and control logic disposed adjacent to the register file and the host processor data transfer control logic along a part of the second side of the buffer circuitry; disk drive interface and buffer memory interface control logic disposed along a part of the second side of the buffer circuitry and adjacent to the drive control and unit select ports; and an interconnect area disposed adjacent to the register file, the register file address decode and control logic, and the disk drive interface and buffer memory interface control logic of the first portion of the microcontroller; a second portion which includes ROM output buffer circuitry disposed adjacent to and between the ROM and the disk drive interface and buffer memory interface control logic of the first portion of the microcontroller; a state counter disposed within the third corner of the buffer circuitry; and a tree decoder circuit disposed adjacent to and between the state counter and the ROM; and a third portion of the microcontroller which includes internal data transfer control logic disposed adjacent to the disk synchronization circuitry and the disk data registers on one side and the error checking circuitry and the register file on the other side; disk data register control logic disposed adjacent to the ROM and the first portion of the microcontroller; and a clock generator disposed adjacent to and between the disk synchronization circuitry and the disk data register control logic, and adjacent to and between the internal data transfer control logic and a part of the fourth side of the buffer circuitry.

BRIEF DESCRIPTION OF THE DRAWINGS

FIGS. 2A and 2B are diagrams illustrating the format in which data is stored on a disk controlled by the HDC of FIG. 1;

Like numbers in different figures refer to like elements.

DETAILED DESCRIPTION OF THE DRAWINGS

Figure 1:
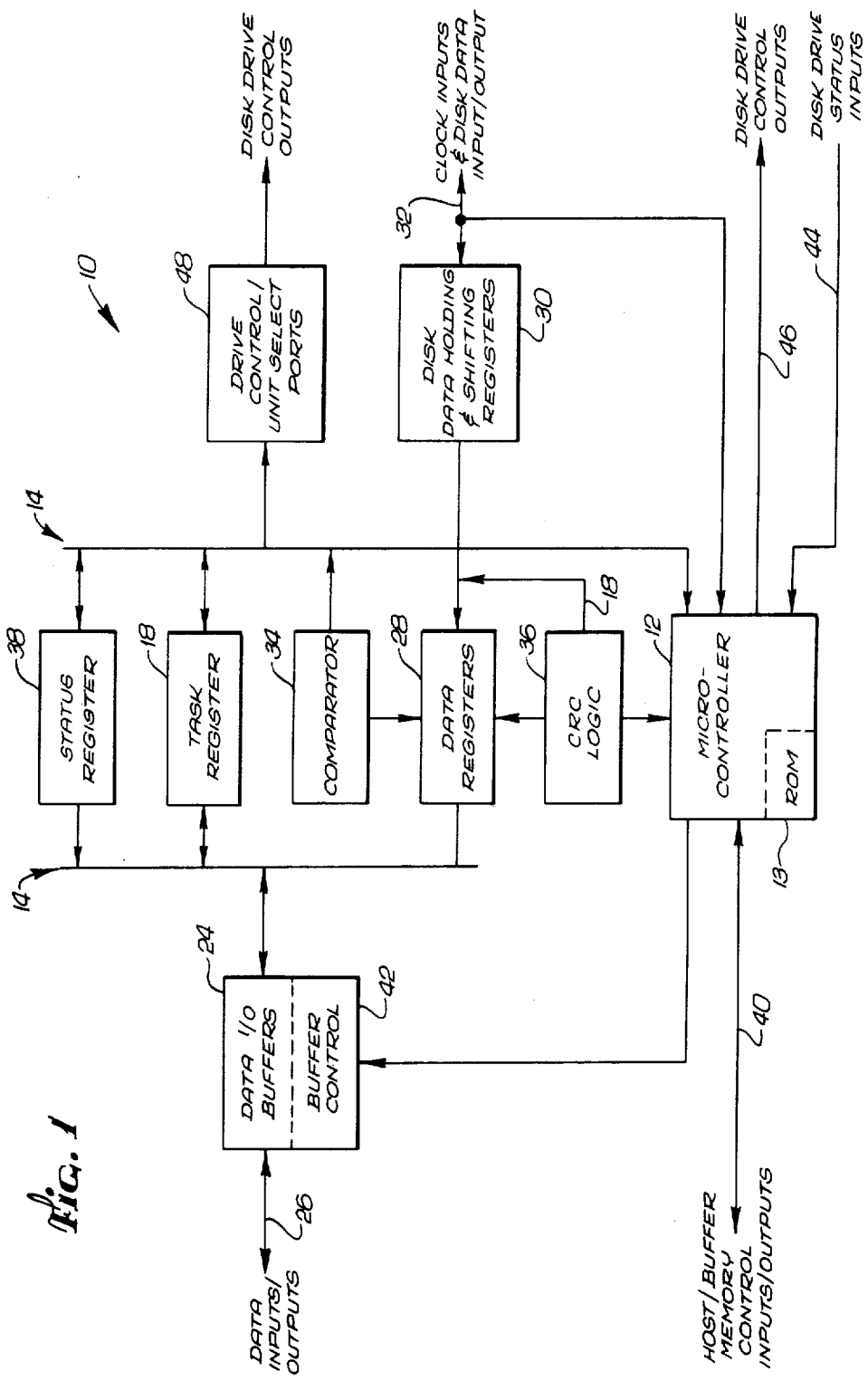
FIG. 1 is a block diagram of a hard disk memory controller circuit (HDC) in accordance with the present invention.

Referring now to FIG. 1, there is shown a block diagram of an HDC circuit 10 in accordance with a preferred embodiment of the present invention. The HDC circuit 10 has a number of subcircuits including a microcontroller 12 which provides overall control of the HDC circuitry. Many of the functions of the microcontroller 12 are implemented in conjunction with a ROM (read only memory) 13 which contains instructions for directing the microcontroller. Connections between the subcircuits are made by means of busses comprising separate conductors which are indicated generally at 14. Because of the great number of conductors required to implement the control functions, particular care must be taken in laying out the MOS LSI circuitry comprising the present invention.

The subcircuits of the HDC circuit 10 further include a set of registers indicated at 18, which are often referred to as "task registers". Among the task registers is a command register in which the system or "host" CPU may write a command to be carried out by the microcontroller 12. In the illustrated embodiment, these commands include (1) RTZ (return to zero); (2) Read Data; (3) Write Data; (4) Read ID Field; (5) Format Sector; (6) Verify Sector; (7) Seek Cylinder; and (8) Fault Clear.

The RTZ command causes the HDC circuit 10 to move the read/write head of the disk memory back to the starting track designated "track 0". Each "track" is a concentric circular path traced out by the read/write head over the disk as the disk rotates beneath the read/write. A disk can typically have a 1000 or more of such tracks.

A disk memory unit (also referred to as a disk drive) can have several co-axial disks and associated read/write heads. Each read/write head has a head number by which the data stored by a particular head may be addressed. The tracks of the disks are identified by a "cylinder" address and each track is subdivided into "sectors".

Figure 4:
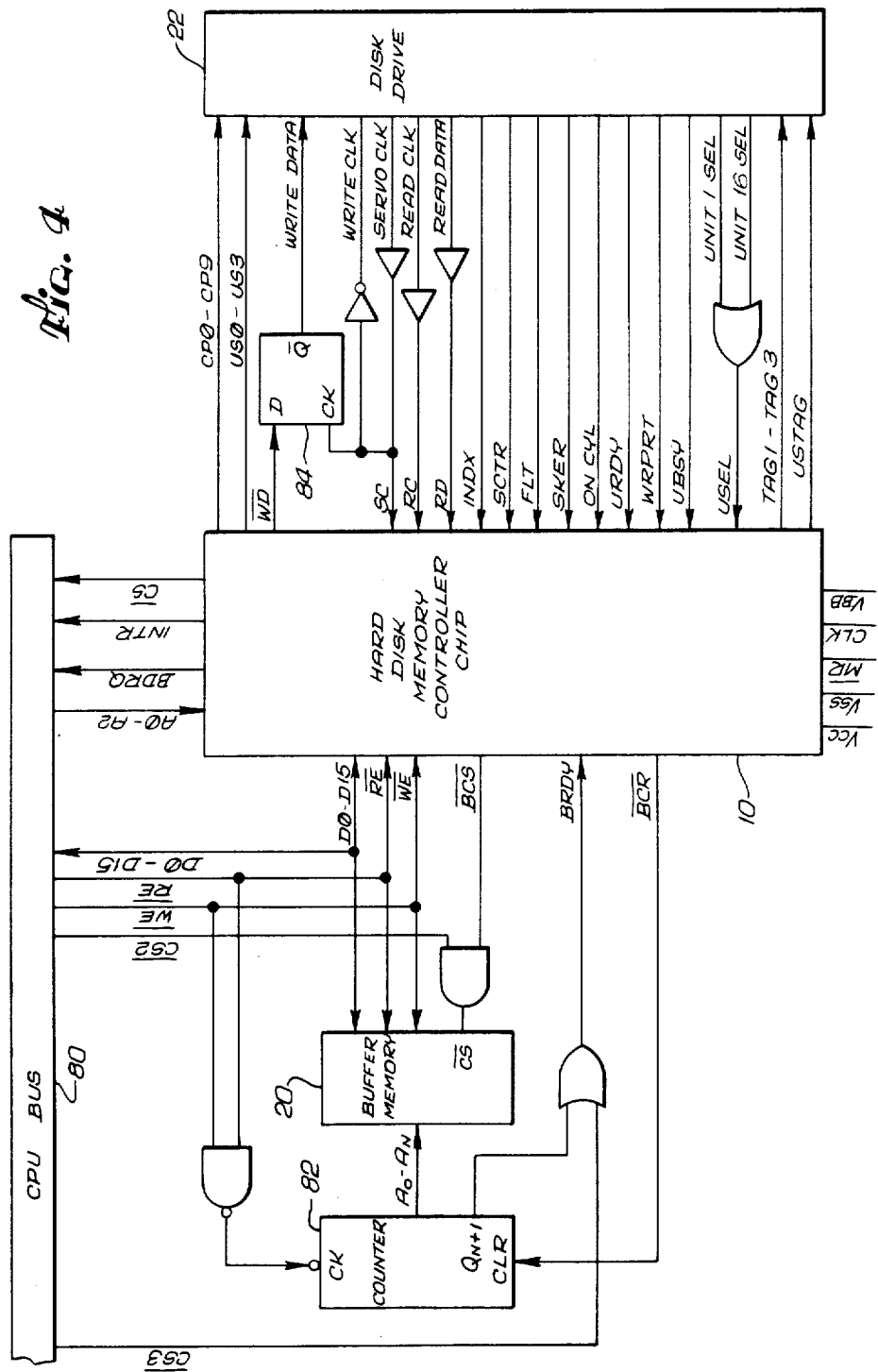
FIG. 4 is a block diagram illustrating the HDC chip of FIG. 1 connected in a computer system having one or more disk drives.

The Seek Cylinder command moves the specified head to a particular cylinder address. A Read Data command causes the HDC chip to read one or more sectors of data starting at a specified cylinder address, head number and sector address. The task registers 18 have a cylinder address register and a head #/sector address register for storing the appropriate address information for each command. This information is stored in the task registers by the host CPU before the command is written into the command register. The data read during the execution of the Read Data command is stored by the HDC circuit 10 in a buffer memory 20 (FIG. 4). Upon completion of the read command, the host CPU can transfer the data from the buffer memory.

When a Write Data command is written into the command register, the HDC chip writes the data previously stored by the CPU in the buffer memory 20, into the disk drive indicated at 22 in FIG. 4. In the illustrated embodiment, the disk drive 22 is a hard disk type disk drive. The HDC chip 10 can control 16 such disk drives. The data is stored in the disk drive 22 at the locations specified in the cylinder and head #/sector address registers of the task registers 18.

Referring now to FIGS. 2A and 2B, the data is stored on the disk in a particular format in which an ID field preceeds a Data field which contains the actual data. The ID field identifies the location or address at which the data is stored. As shown in FIG. 2B, the ID field includes the cylinder address, head number, sector address and two error check character bytes designated CRC1 and CRC2. These characters are generated by the HDC chip, as is more fully described below. A Read ID Field command allows the host CPU to read the ID information. The ID field is stored by the HDC circuit 10 in a buffer memory 20 (FIG. 4). Upon completion of the Read ID Field command, the host CPU can transfer the data from the buffer memory.

FIG. 2A shows that the data in the Data field is preceded by 13 bytes of zeros and the synchonization character "FE", and is followed by two error check character bytes (CRC1 and CRC2) and at least nine bytes of zeros (marking the end of the sector). A Write Data command writes only the Data field onto the disk after the appropriate sector has been found. A Format Sector command writes the entire format i.e., both the Data field and the ID field which is preceded by 27 bytes of zeros and the synchronization character "FE". A Verify Sector command allows verification of the sector format without transferring any data.

In the illustrated embodiment, more than one sector of data can be transferred with a single command. In addition, the number of bytes of data to be stored in the sectors can be varied. One of the task registers is provided to store the sector size and number of sectors to be transferred information from the host CPU before the data transfer command is written into the command register and executed. The unit number of the particular drive unit to be accessed is also written into this register.

Finally, the task registers also include a Sync Character/Format Character register. The sync character is an 8-bit field containing the arbitrary character "FE" (1111 1110) which is used as a locaton header preceeding the ID field and the Data field as previously described. The format character is an 8-bit field containing the character "E5" (1110 0101) which is used as the Data field pattern during formatting of the data. This register is not accessible by the host CPU.

Referring back to FIG. 1, the various registers of the task registers 18 (with the exception of the Sync Character/Format Character register described above) can be individually addressed by the host CPU to read information or write information, as appropriate, into the registers. Both the task register data and the data transferred between the buffer memory 20 and the disk drive 22 pass through the data input/output (I/O) buffer circuitry 24. The data I/O buffers 24 are tristate buffers and are coupled by an external bus 26 to the host CPU and the buffer memory 20. The data bus 26 may be either a 16-bit bus or an 8-bit bus. The buffers 24 ensure that the voltage levels of the input data signals are compatible with the other circuitry of the HDC chip 10.

The data transferred between the buffer memory 20 and the disk drive 22 is temporarily stored in a set of data registers 28. These registers include a 16-bit "Data In" register for the write data which is written onto a disk, and a 16-bit "Data Out" register for the read data read from a disk.

The write data in the Data In register is transferred 8 bits at a time to an 8-bit write data holding register (WDH) of the disk data holding and shifting registers indicated at 30. The WDH register provides an 8-bit parallel output to an 8-bit write data shift register (WDS) of the registers 30. This 8-bit shift register converts the 8-bit parallel input from the write data holding register into a serial bit stream. The serial data is transmitted to the disk drive 22 (FIG. 4) on one of the input and output lines indicated at 32. The WDS register is clocked by a clock signal designated "servo clock" provided to the HDC chip 10 by the disk drive 22.

Conversely, the serial data read from the disk drive 22 is inputted by a read data shift register (RDS). The read data shift register converts the serial data to 8-bits of parallel data and is clocked by a clock signal designated "read clock" which is also provided by the disk drive 22. The disk data holding and shifting registers 30 also have a read data holding register (RDH) which assembles the bytes from the read data shift register and transfers them to the Data Out register of the data registers 28 for transfer to the buffer memory 20.

A comparator circuit 34 compares the bytes read from the disk and stored in the Data Out register with various fields in the task registers 18. For example, the comparator 34 compares the disk data with the character stored in the sync character register to identify the sync character from the read data. Similarly, the comparator 34 compares the bytes of the ID field as they are transferred to the Data Out register with the appropriate fields of the cylinder address and head number/sector address registers to determine if the requested data has been found.

As previously mentioned, both the ID field and the Data field include two bytes of CRC (cyclic redundancy check) characters which provide a check for these fields to determine whether an error has occurred in the process of storing and receiving the data. The CRC characters are computed by a CRC logic circuit shown at 36 in FIG. 1. As data is written onto the disk, the CRC characters are transferred to the Data In register of the data registers 28 and appended to the ID field and the Data field during the Format Sector or Write Data commands. When the data is read back from the disk, the CRC characters are recomputed and compared with the CRC characters read from the disk to determine if an error has occurred.

The HDC circuitry 10 also includes a status register 38 which reflects the operational status of the HDC chip and the disk drive. The status register 38 is a read only 16-bit register and can be accessed by either the microcontroller 12 of the HDC chip or the host CPU.

As previously mentioned, the microcontroller 12 provides overall control of the HDC circuitry. In particular, the microcontroller 12 decodes the commands written in the command register of the task registers 18 and implements the execution of the commands. The microcontroller 12 also monitors the comparator circuit 34 and the CRC logic 36 as well as the status register 38. In addition, the microcontroller 12 is coupled by a plurality of control lines 40 on which control signals are transmitted and received between the microcontroller 12 and the external host CPU and buffer memory. Other functions of the microcontroller 12 include overseeing the operation of a buffer control circuit 42 which controls the direction and enabling of the tristate buffers of the data I/O buffers 24. The buffer control circuitry 42 gates the data between the HDC chip 10 and the buffer memory 20 or the host CPU.

Furthermore, the microcontroller 12 monitors the status of the various disk drives through a plurality of control signal lines 44 and generates appropriate disk drive control signals on a plurality of control signal lines 46. The microcontroller 12 can latch additional disk drive control signals in a register contained within the ports indicated at 48. The HDC chip 10 can control up to 16 hard disk drive units and a second register is provided in the ports 48 for latching the address of the particular drive unit selected.

Figure 3:
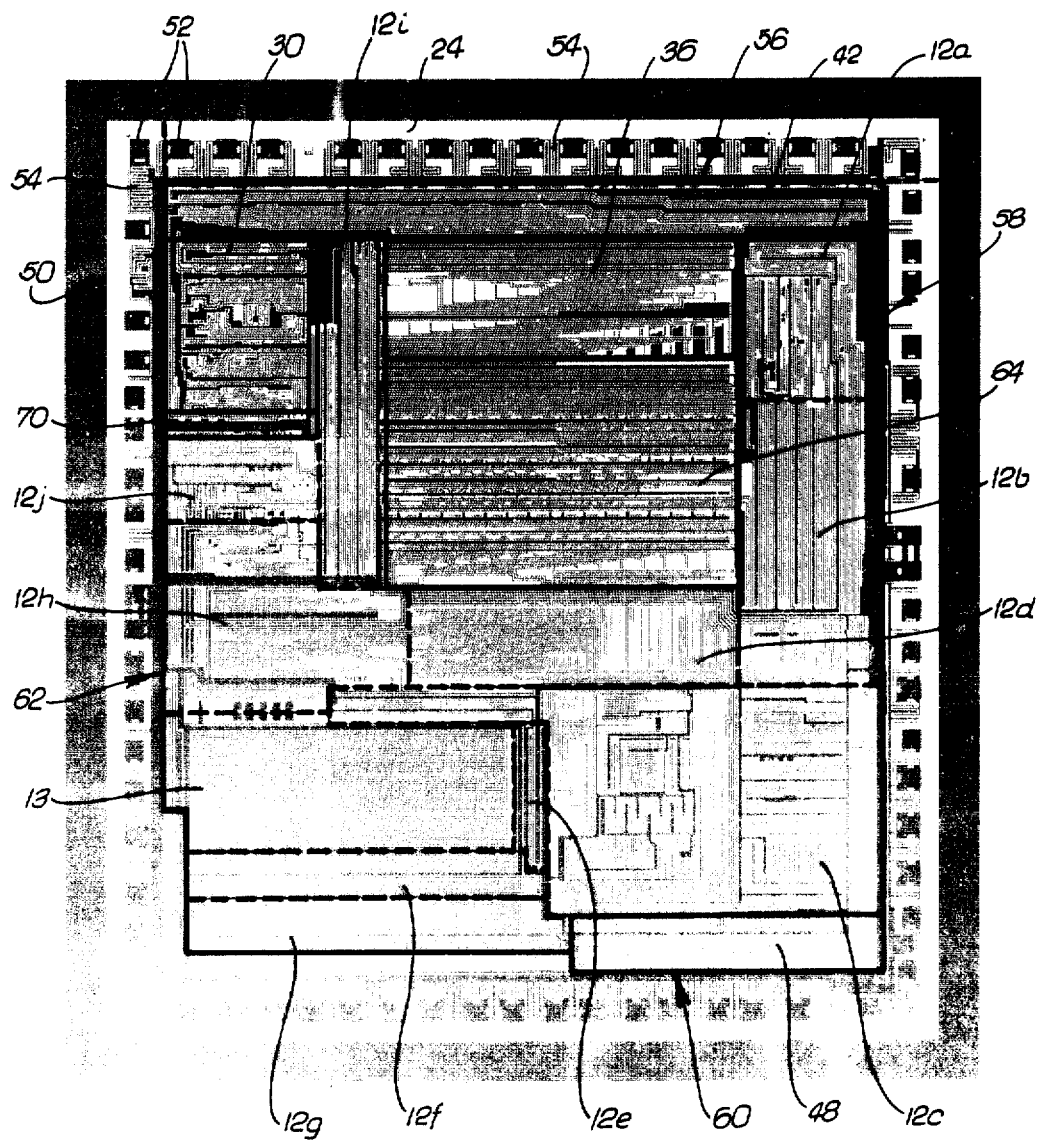
FIG. 3 is a diagram illustrating the general location on a semiconductor chip of elements of an HDC circuit in accordance with the present invention.
Figure 10:
FIG. 10 is a scale drawing of a photomask used to pattern the metal interconnection layer of a MOS HDC chip according to the invention.

Referring now to FIG. 3, the general location of the HDC circuitry on a semiconductor chip is illustrated with respect to the metal interconnection layer pattern of FIG. 10. The periphery 50 of the chip is used for the bonding pads 52 which couple the HDC circuitry to the input/output pins of the external package in a conventional fashion. The periphery 50 also includes buffer circuitry to ensure that the output signals from the HDC chip are electrically compatible with the external circuitry, and vice-versa. In the illustrated embodiment of the HDC chip, the buffer circuitry 54 enables the N-MOS circuitry of the HDC chip to interface with TTL logic levels.

As shown in FIG. 3, the bonding pads 52 and buffer circuitry 54 form an approximately quadrilateral framework on the chip. A first side 56 of this quadrilateral framework is formed by the data I/O buffers 24. Located within the quadrilateral framework are the following subportions of the HDC circuit:

The data I/O buffer control circuitry 42 is disposed adjacent to the data I/O buffers 24 along a first side 56 and within a first and a second corner of the buffer circuitry 54;

A first portion of the microcontroller 12, which includes constituent parts indicated at 12a-12d, is disposed adjacent to the data I/O buffer control circuitry 42 and along part of a second side of the buffer circuitry 54 indicated at 58;

The drive control and unit select ports 48 are disposed adjacent to the first portion of the microcontroller 12 and along a part of a third side 60 and within a third corner of the buffer circuitry 54;

A second portion of the microcontroller 12 which includes the constituent parts indicated at 12e-12g is disposed adjacent to the first portion of the microcontroller 12 and the drive control and unit select ports 48 and along the third side 60 and within a fourth corner of the buffer circuitry 54;

The ROM 13 of the microcontroller is disposed adjacent to the second portion of the microcontroller and along a part of a fourth side 62 of the buffer circuitry 54;

A third portion of the microcontroller 12, which includes the constituent parts indicated at 12h-12j, is disposed adjacent to the ROM 13 and along a portion of the fourth side 62 of the buffer circuitry 54;

Disk synchronization circuitry 70 for synchronizing the operation of the HDC chip 10 with the rotation of the disk is disposed adjacent to the third portion of the microcontroller 12 and along a part of the fourth side 62 of the buffer circuitry 54;

The disk data holding and shifting registers 30 are disposed adjacent to and between the synchronization circuitry 70 and the data I/O buffer control circuitry 42 and along a part of the fourth side 62 of the buffer circuitry 54;

The CRC logic 36 is disposed adjacent to and between the first and third portions of the microcontroller 12 and also adjacent to the data I/O buffer control circuitry 42; and The register file 64 which includes the status register 38, the task registers 18, the comparator logic 34 and the data registers 28, is disposed adjacent to and between the first and third portions of the microcontroller 12 and also adjacent to the CRC logic 36.

Figure 11:
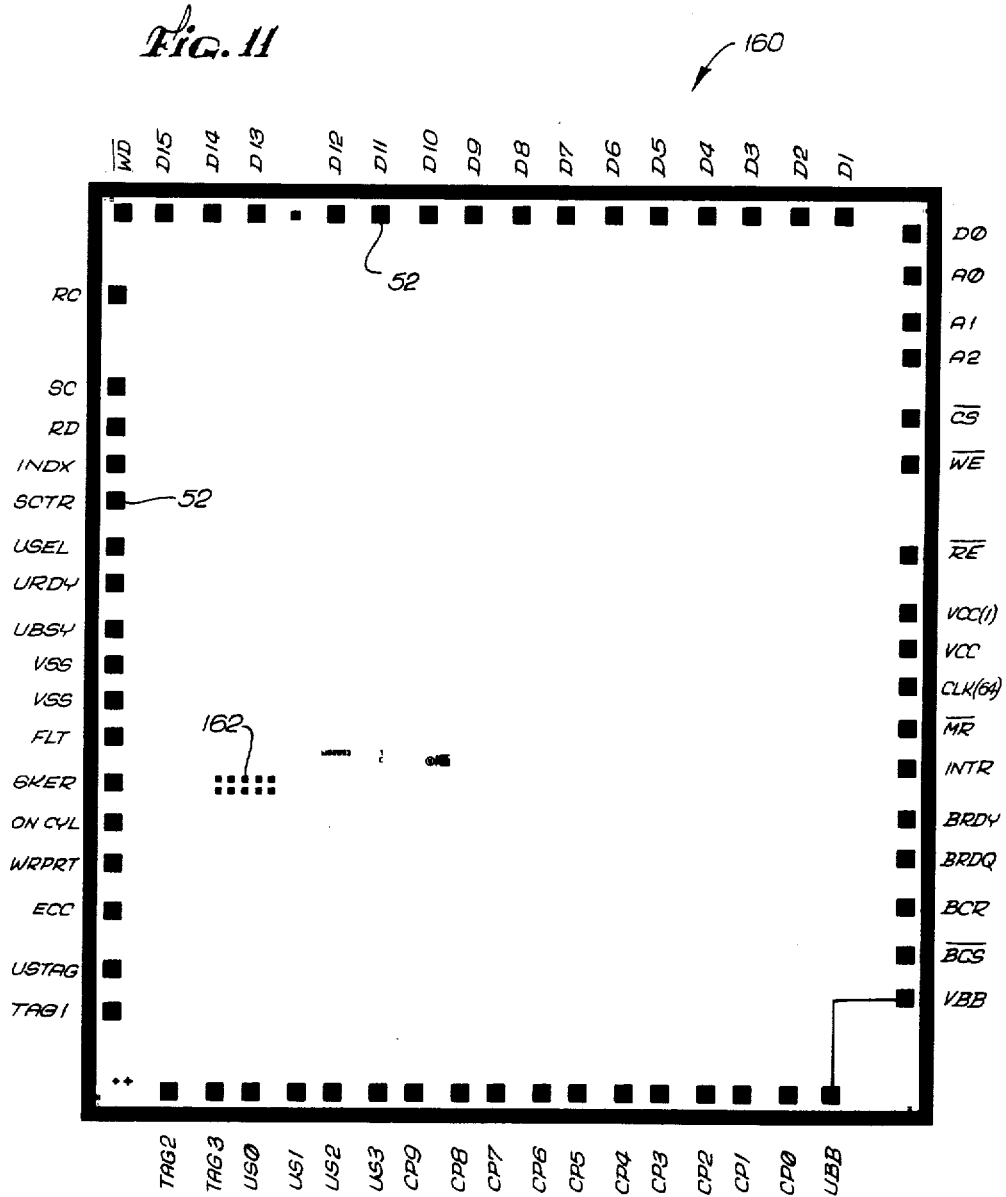
FIG. 11 is a scale drawing of a photomask used to define and isolate the chip bonding pads while the remainder of the chip is protectively coated during the manufacture of a MOS HDC chip according to the invention.

Referring now to FIG. 11, the bonding pads 52 for the HDC chip are arranged around the periphery 50 of the chip in an order particularly well suited for housing the HDC chip in a 64-pin or 68-pin package within the conventional requirements for bonding 1 and angles. In the present embodiment, beginning with the top side of the chip 10, and proceeding clockwise, the bonding pad and pin order of the HDC chip is set forth in the following table which provides the symbol, name and a short description of each pin (and the signal lines associated with each pin):

TABLE

| SYMBOL | NAME | DESCRIPTION |
|---|---|---|
|  | D$\emptyset$14 D15 Buffers | Data I/O A sixteen bit bidirectional three-state I/O data bus used for host/buffer memory/HDC communication. |
|  | A0-A2 | Address Bus These address inputs are used to select a register from the register file. |
| $\overline{CS}$ | Chip Select | An active low input that enables the HDC's $\overline{Read\ Enable}$ and $\overline{Write\ Enable}$ I/O signals as active inputs if the HDC Status register or task registers are selected and the HDC Buffer $\overline{Chip\ Select}$ ($\overline{BCS}$) output is not active. This input is ignored when $\overline{BCS}$ is active. |
| $\overline{WE}$ | Write Enable | An active low bidirectional three-state input/output used for data transfers. |
| $\overline{RE}$ | Read Enable | An active low bidirectional three-state input/output used for data transfers. For host controlled transfers (ie., the $\overline{BCS}$ output is not active), the contents of the Status register are placed on the Data I/O Buffers (D$\emptyset$-15) when $\overline{CS}$ and $\overline{RE}$ are made active. For Direct Buffer Access transfer (ie., $\overline{BCS}$ is active), $\overline{Read\ Enable}$ is output enabled. When the HDC makes $\overline{RE}$ active the contents of the buffer memory should be placed on the Data I/O Buffers. Data is read into the HDC on the trailing edge of $\overline{RE}$. |
| VCC | Power Supply | +5 Volts ± 5%. |
| CLK | Clock | System clock input (2 MHZ). Internal clocking is switched between this input and the Drive Interface Servo Clock (SC) input as needed. |

TABLE-continued

| SYMBOL | NAME | DESCRIPTION |
|---|---|---|
| $\overline{\text{MR}}$ | Master Reset | An active low input that resets the device. |
| INTR | Interrupt Request | An active high output activated upon command execution completion or termination (if enabled). |
| BRDY | Buffer Ready | A low to high transition triggered input. For host to drive transfers, BRDY indicates the data is available in the buffer memory for a Direct Buffer Access transfer by the HDC from the buffer memory to the disk. For drive to host transfers, BRDY indicates that the buffer is empty and ready to store data made available by the HDC during a Direct Buffer Access transfer from the disk to the buffer. |
| BDRQ | Buffer Data Request | An active high output used to indicate that the buffer memory should be serviced by the host. For host to drive transfers, the buffer memory should be filled by the host when BDRQ is made active. For drive to host transfers, the buffer memory should be read by the host when BDRQ is made active. |
| $\overline{\text{BCR}}$ | Buffer Counter Reset | An active low output intended to clear a counter for RAM based buffer designs. This output is pulsed at the beginning of each activation of the $\overline{\text{BCS}}$ is active. |
| $\overline{\text{BCS}}$ | Buffer Chip Select | An active low output intended to select the buffer memory for Direct Buffer Access transfers. The HDC's $\overline{\text{RE}}$ and $\overline{\text{WE}}$ signals are output enabled when BCS is active. |
| VBB | Back Bias | No Connection. |
| CP0-9 | Control Port | These ten outputs are used to issue cylinder address, head (and volume) address and control information to the drive. |
| US0-3 | Unit Select | These four outputs reflect the contents of the Unit Address field of the task registers, and select one of 16 drives. |
| TAG 3 | Control Tag | An active high output used to indicate that the Control Port (CP0-9) will be used to issue control signals to the drive to execute the Op Code command. |
| TAG 2 | Head Tag | An active high output used to indicate that the contents of the Head # field of the task registers are on the Control Port (CP0-7). The drive should select this volume (if applicable)/head upon receipt of Tag 2. |
| TAG 1 | Cylinder Address Tag | An active high output used to indicate that the contents of the Cylinder Address field (bits 0-9) of the task registers are on the Control Port (CP0-9). The drive should seek this cylinder upon receipt of Tag 1. |
| US TAG | Unit Select Tag | An active high output used for unit selection. The drive should select the unit indicated by the Unit Select lines US0-3 when the US Tag is activated. |
| ECC | ECC | An active high output used to synchronize external ECC logic to the Data Field. |
| WR PRT | Write Protected | An active high output, sampled before execution of a Format Sector or Write Data command. Write Protected must be inactive for execution of these commands. If WR PRT is active, the Write Gate signal within the drive should be disabled. |
| ON CYL | On Cylinder | An active high input used to monitor head position in the drive. When ON CYL is made active, the heads should be positioned over a specific cylinder. |
| SK ER | Seek Error | An active high input used to monitor Seek Error status from the drive. |
| FLT | Fault | An active high input used to monitor a Fault condition within the drive. |
| VSS | Ground | Ground |
| U BSY | Unit Busy | An active high input used to monitor drive status upon a selection attempt. If the unit has already been selected and/or reserved prior to this HDC's issuance of the US Tag, Unit Busy should be made active within 1 microsecond of the issuance of the US Tag. This input is used only for dual channel access applications and should otherwise be tied to ground. |
| U RDY | Unit Ready | An active high input used to monitor the Unit Ready input from the drive. If Unit Ready is made inactive during execution of any command other than the Fault Clear or RTZ commands, command execution is terminated. |
| U SEL | Unit Selected | An input from the drive units that one unit has been selected. |
| SCTR | Sector | An active high input used to monitor the drive's sector pulse. |
| INDX | Index | An active high input used to monitor the drive's index pulse. |
| RD | Read Data | A NRZ data input from the drive. Data on this input must be synchronized to the Read Clock (RC) input. |
| SC | Servo Clock | A 9.677 MHZ nom. clock input from the drive. This clock must be valid whenever Unit Ready (U RDY) is active and Fault is inactive. |
| RC | Read Clock | A clock input from the drive used to assemble bytes from the Read Data input. |
| $\overline{\text{WD}}$ | Write Data | An open drain inverted NRZ data output synchronized to the Servo Clock input used to write data to the drive. (This output may be delayed one Servo Clock period at the drive interface.) |

The above-described sequence of pins for the HDC chip is chosen to provide maximum utility in placing the HDC chip on a circuit board.

Referring now to FIG. 4, there is shown a block diagram illustrating the HDC chip 10 connected in a typical computer system. As can be seen from FIG. 4, the HDC chip is coupled to a CPU bus 80 by the pins (and associated signal lines) $\overline{CS}$, INTR, BDRQ, the address lines AO-A2, the Data Bus D0-D16, $\overline{RE}$, $\overline{WE}$, and BRDY. The HDC chip 10 is also coupled to the buffer memory 20 by the data bus D0-D15, $\overline{RE}$ and $\overline{WE}$ and $\overline{BCS}$.

In the illustrated embodiment, the address signals $A_0$-$A_N$ for addressing the buffer memory 20 are generated by a toggle counter 82. Alternatively, a first in and first out (FIFO) buffer memory may also be utilized.

The host processor or CPU (not shown) coupled to the CPU bus 80 starts a disk operation by writing the task information into the task registers 18 in the HDC chip 10. As previously mentioned, disk task information includes (where appropriate) the disk cylinder, head and sector numbers, drive number, the sector size and the number of sectors to be transferred. After the appropriate task information has been written, the host CPU writes the command into the command register. This command is then decoded by the HDC microcontroller and executed.

In the case of a read data command, the microcontroller causes the buffer counter reset ($\overline{BCR}$) output to be pulsed which clears the counter 82, and the buffer chip select ($\overline{BCS}$) output is activated. When the appropriate sector is successfully located on the disk, the HDC chip 10 issues the data to the buffer memory 20 on the data bus D0-D15 and pulses the write enable ($\overline{WE}$) line to write the data words from the HDC chip 10 to the buffer memory 20 until one sector of data is transferred.

For multiple sector commands, the HDC chip 10 inspects the BRDY input to determine if the buffer memory 20 is full. If so, the HDC chip 10 deactivates the buffer chip select output ($\overline{BCS}$), pulses the $\overline{BCR}$ output resetting the counter, and activates the buffer data request (BDRQ) output thereby requesting the host CPU to read the buffer memory.

Once the host CPU has indicated on the BRDY input to the HDC chip 10 that reading of the buffer memory 20 has been completed, the HDC chip deactivates the buffer data request (BDRQ) output. The operation returns to the beginning pulsing $\overline{BCR}$ and activating the BCS to transfer the next sector. Upon the transfer of the last sector, the HDC chip deactivates BCS, pulses $\overline{BCR}$, and activates BDRQ (requesting the host CPU to read the buffer memory 20). Once the host CPU signals on the BRDY input that the buffer memory 20 has been emptied, the HDC chip 10 deactivates BDRQ and pulses $\overline{BCR}$ completing execution of the read data command.

To execute a write data command, the HDC chip 10 pulses the buffer counter reset output ($\overline{BCR}$) and activates the buffer data request (BDRQ) output to signal the host CPU to fill the empty buffer memory 20. Once the host CPU activates the BRDY input to the HDC chip indicating that the buffer memory 20 is full, the HDC chip pulses the $\overline{BCR}$ output and activates the $\overline{BCS}$ output.

When the appropriate sector location is successfully located on the disk, the HDC chip pulses read enable ($\overline{RE}$), reads the information on the data bus D0-D15 from the buffer memory 20 and transfers the data to the disk drive 22 until one sector of data is transferred.

For multiple sector commands, the HDC inspects BRDY input to determine if the buffer is empty. If so, the HDC deactivates $\overline{BCS}$, pulses $\overline{BCR}$ and activates BDRQ to request the host to fill the buffer. The HDC then inspects the BRDY input to determine when the host has filled the buffer memory 20 as described above. Once the final sector has been transferred, the HDC deactivates the $\overline{BCS}$ output and pulses the $\overline{BCR}$ output to complete the execution of the write data command.

Following command execution, the HDC chip will reset a status bit in the status register and activate the interrupt request (INTR) output. The INTR output is subsequently deactivated following the next read of the status register. The HDC chip is then ready to be programmed to execute its next command. Transceivers are used to control the data bus D0-D16 and the $\overline{WE}$ and $\overline{RE}$ control signal lines among the HDC chip 10, the buffer memory 20 and the CPU bus 80, and have not been shown for clarity.

On the disk drive side of the HDC chip 10, the write data ($\overline{WD}$) output on which the write data to the disk drive 22 is provided, is coupled to the input of a D flip flop 84 which is clocked by a servo clock signal from the disk drive 22. While executing a write data command, the HDC chip switches its internal clock from the system clock (the CLK input) to the servo clock (SC) input provided by the disk drive 22. The output of the flip flop 84 is inputted by the disk drive 22.

The drive control/unit select ports 48 are coupled by 10 output lines designated CP0-CP9 to the disk drive 22. These 10 outputs, in conjunction with the TAG 0-TAG 3 outputs to the disk drive 22 are used to provide cylinder address, head (and volume) address and other control information to the disk drive 22.

The drive control/unit select ports 48 also have four output lines designated "Unit Select" (US0-US3) which are used in connection with the "Unit Select Tag" (US TAG) output to select a particular disk drive. The remaining input and output pins of the HDC chip 10 are described in the table above.

Referring back to FIG. 3, the various subcircuits of the microcontroller 12 are indicated in broken line. The first portion of the microcontroller 12 includes host processor or CPU data transfer control logic 12a disposed adjacent to the CRC logic 36 and the buffer control logic 42 along a part of the second side 58 of the buffer circuitry 54. The host processor data transfer control logic 12a controls the transfer of the data through the data I/O buffers 24 between the HDC chip 10 and the host processor or the buffer memory.

Disposed adjacent to the register file 64 and the host processor data transfer control logic 12a along a part of the second side 58 is the register file address decode and control logic 12b of the first portion of the microcontroller. The register file address decode and control circuitry 12b decodes the address signals transmitted from either the microcontroller or the host CPU to select a particular register to enable that register to be read from or written into.

The first portion of a microcontroller also has a disk drive interface and buffer memory interface control logic 12c disposed along a part of the second side 58 of the buffer circuitry 54 and adjacent to the drive control/unit select ports 48. The disk drive interface and buffer memory interface control logic issues and receives the control signals between the HDC chip 10 and the CPU and/or the buffer memory. In addition, the logic 12c issues and receives control signals between the HDC chip 10 and the disk drives. Finally, the first portion of the microcontroller also includes an interconnect area 12d disposed adjacent to the register file 64, the register file address decode and control logic 12b and the disk drive interface and buffer memory interface control logic 12c for interconnecting these areas with each other and other portions of the HDC chip.

The microcontroller 12 also has a second portion which is generally disposed within the third corner of the buffer circuitry 54 and adjacent to the ROM 13 of the microcontroller. The second portion of the microcontroller 12 includes ROM output buffer circuitry 12e disposed adjacent to and between the ROM 13 and the disk drive interface and buffer memory interface control logic 12c of the first portion of the microcontroller 12. The output buffer circuitry 12e samples and stores data supplied by the ROM. The output from the buffer circuitry 12e is connected to other decode circuitry throughout the device.

The second portion of the microcontroller 12 also includes a tree decoder circuit 12f and a state counter 12g which are disposed within the third corner of the buffer circuitry 54. The state counter 12g provides a sequence of control signals to control the addressing of the ROM 13. The state counter is selectively incremented or loads a value issued by the ROM output buffer circuitry 12e. Whether or not the state counter is selectively incremented or loaded with a value depends upon the previous state of the ROM output buffers 12e and the status of other nodes in the microcontroller chip. The tree decoder circuit 12f is disposed adjacent to and between the state counter 12g and the ROM 13, and selectively charges one state line which is an output to the ROM 13, by decoding the outputs from the state counter 12g.

A third portion of the microcontroller 12 includes disk data holding and shifting register control logic 12h internal data transfer control logic 12i and a clock generator 12j. The disk data register control logic 12h is disposed adjacent to the ROM 13, and the disk drive interface and buffer memory interface control logic 12c and the interconnect area 12d of the first portion of the microcontroller 12. The disk data register control logic 12h controls the RDS, RDH, WDS, and WDH registers of the disk data holding and shifting registers 30 and the status register of the register file 64. Information from the ROM output buffer circuitry 12e is decoded in conjunction with the status of other nodes in the controller to control these registers.

The internal data transfer control logic 12i is disposed adjacent to the disk data register control logic 12h the disk synchronization circuitry 70 and the disk data registers 30 on one side and the CRC circuitry 36 and the register file 64 on the other side. The internal data transfer control logic 12i controls the data transfer between the holding registers, RDH and WDH, of the disk data registers 30, and the data registers 28 of the register file and the CRC logic 36. Finally, the clock generator 12j is disposed adjacent to and between the disk synchronization circuitry 70 and the internal data transfer control logic 12j and along a part of the fourth side 62 of the buffer circuitry 54.

Figure 5:
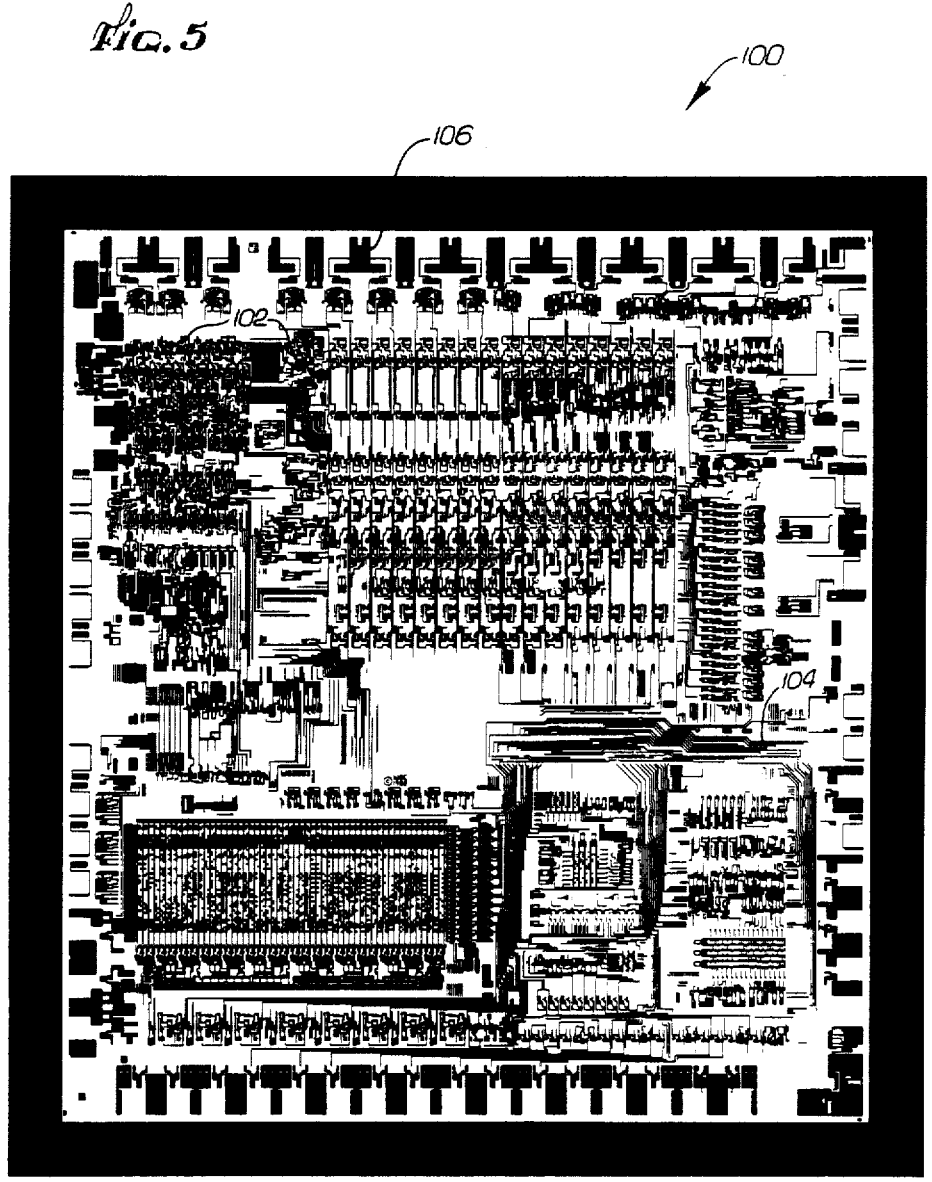
FIG. 5 is a scale drawing of a photomask utilized to pattern the substrate layer in which the source-drain and interconnect diffusion areas are subsequently formed in the manufacture of a MOS HDC chip according to the invention.

Referring now to FIG. 5, there is shown a drawing of the source-drain definition mask 100 utilized in manufacturing a preferred embodiment of the invention by means of the well known N-channel self-aligned silicon gate MOS manufacturing process. The pattern of dark regions on the chip, such as area 102, designate areas where the source, drain, and channel regions of the MOS field effect transistors (FET's) comprising the HDC chip circuitry are to be subsequently formed. The long, slender lines, such as area 104, designate areas where diffused conductors are to be subsequently formed. Also shown are the source-drain definition patterns 106 for a portion of the circuitry required for the input and output lines to the HDC chip.

Figure 6:
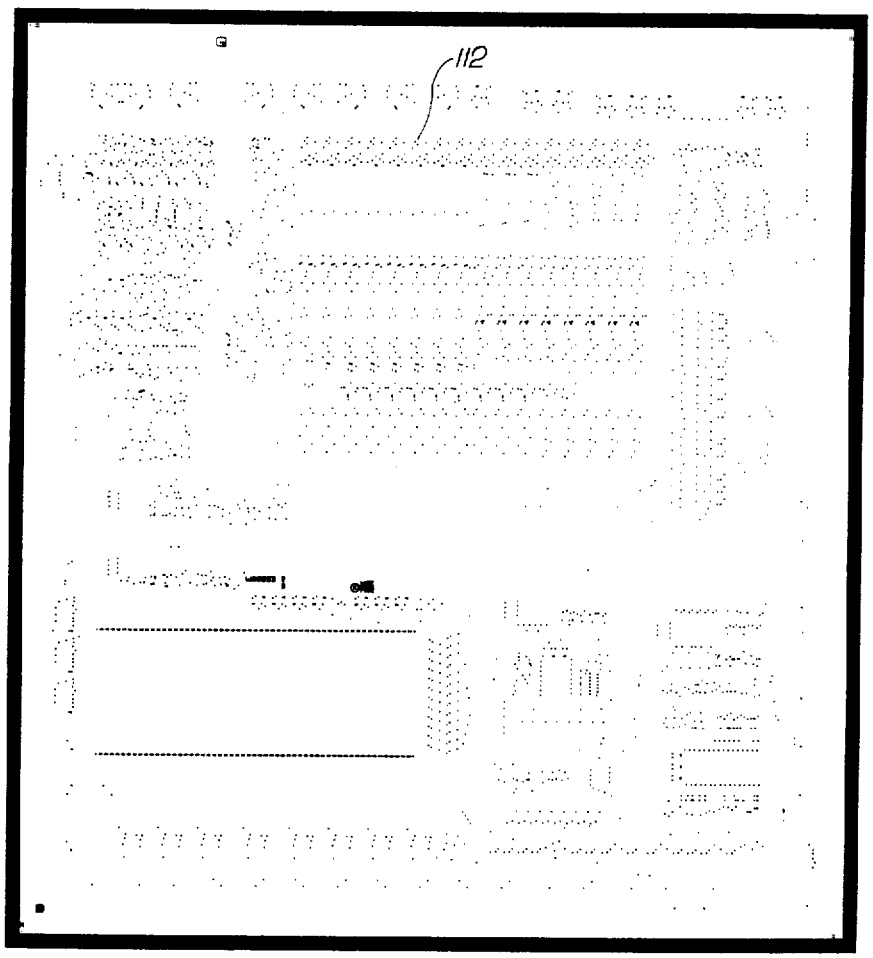
FIG. 6 is a scale drawing of a photomask used to form contacts between a polycrystalline silicon layer and diffusion areas in the manufacture of a MOS HDC chip according to the invention.
Figure 7:
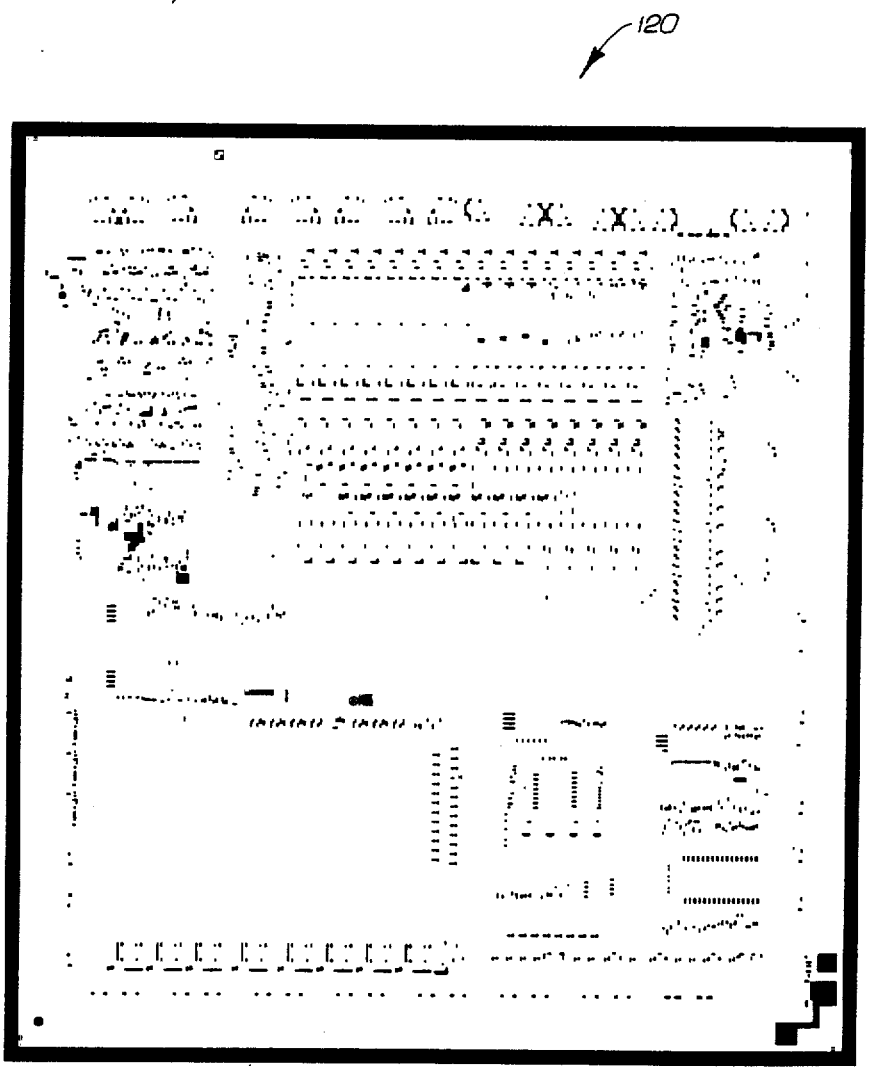
FIG. 7 in a scale drawing of a photomask used to pattern the depletion implants of a MOS HDC chip according to the invention.
Figure 8:
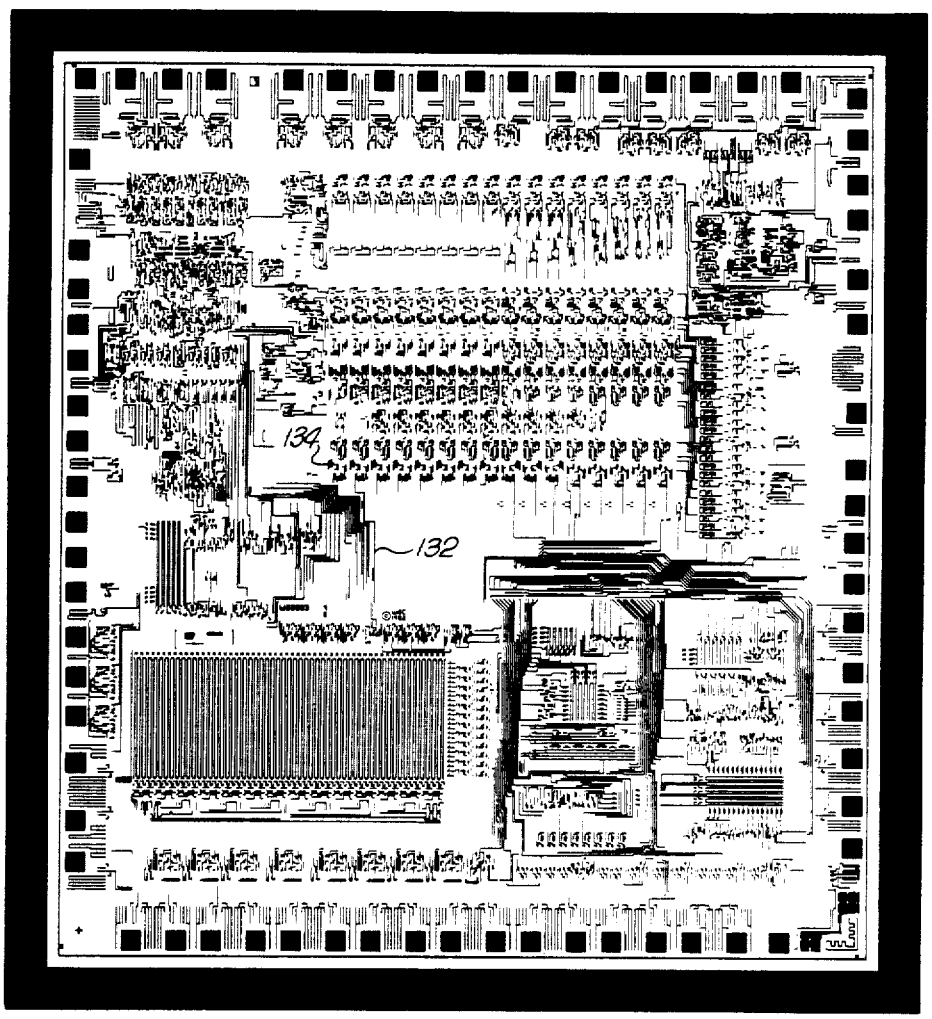
FIG. 8 is a scale drawing of a photomask used to pattern the polycrystalline silicon layer of a MOS HDC chip according to the invention.

The source-drain definition mask 100 is used to etch patterns in field oxide grown on a P-type silicon substrate which forms the basic structure of the entire HDC chip. After the field oxide is patterned using the source-drain definition mask 100, a thin gate oxide is grown over the entire chip area. This thin gate oxide is then patterned by the diffusion contact mask 110, illustrated in FIG. 6. The dark areas (such as 112) of the diffusion contact mask 110 indicate where polycrystalline silicon-to-diffused region contacts are to be made. After these contact holes are formed in a conventional manner, polycrystalline silicon is deposited over the entire chip structure. FIG. 7 shows the photomask 120 which is used to pattern the depletion implants of the HDC circuitry. The polycrystalline silicon is then patterned using the polymask 130 shown in FIG. 8, which defines the gate electrodes of the FET's that form the active devices comprising the HDC circuitry, and also defines polycrystalline interconnection lines. For example, the long, thin lines 132 are polycrystalline conductors utilized as interconnectors, and do not act as FET gate electrodes. The dark regions, such as 134, represent FET gate electrodes.

Figure 9:
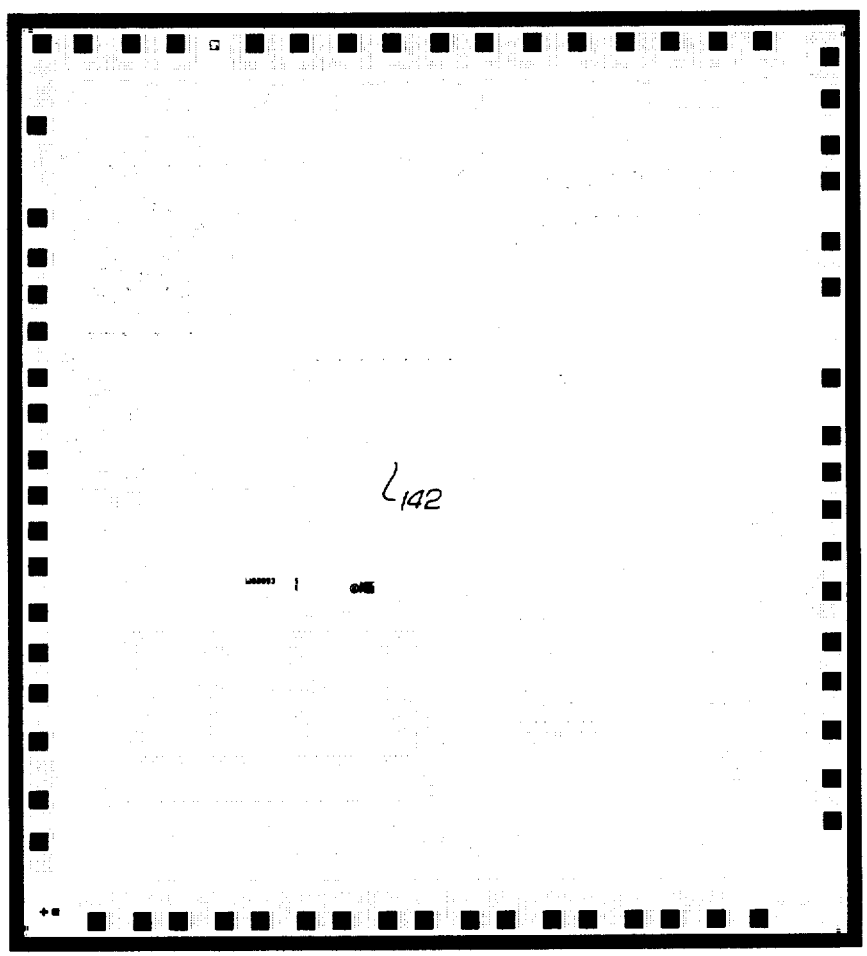
FIG. 9 is a scale drawing of a photomask used to define the pattern of the preohmic contacts that connect a metallized layer to the polysilicon layer and to the source-drain diffusion areas during the manufacture of a MOS HDC chip according to the invention.

After the HDC chip is patterned with the polymask 130, the entire chip is diffused with N+ material in a conventional manner to complete the formation of the self-aligned silicon gate FET's. Thereafter, silicon oxide is deposited over the entire chip to act as an insulating protective layer. The silicon oxide coating is then etched with the pattern of the preohmic mask 140 shown in FIG. 9. The dark areas, such as 142, define contact points to the polycrystalline silicon conductors and diffusion layer conductors. These contact points will connect to a metal covering that is subsequently applied to the chip.

After etching the HDC chip with the preohmic mask 140, the entire chip is coated with a metallic layer, which is then patterned by conventional etching techniques with the metal interconnect mask 150 shown in FIG. 10. The pattern of the metal interconnect mask 150 defines the final level of the device interconnection on the HDC chip. Note, a reproduction of this mask was used in FIG. 3 to indicate the boundary lines for the various subcircuits and hence the topology of the HDC chip 10.

As a last step, the protection mask 160 disclosed in FIG. 11 is used to define all the areas on the HDC chip that are not to be coated with a protective oxide coating. The bonding pad areas 52 of the chip are masked off by the protection mask 160 so that they will not be covered with the protective coating, thereby ensuring that the bonding properties of the pad areas 52 remain unaffected. Also masked off from the subsequently applied protective coating are several test points 162 used for test probes during the production and testing of the HDC chip.

The information disclosed by FIGS. 5 through 11 illustrates the geometry and interconnections of all of the MOS FET's comprising the HDC circuit described as the preferred embodiment herein. It will be noted in reviewing FIGS. 5 through 11, but in particular FIGS. 5 and 8, that many of the mask patterns forming the MOS FET's and their interconnections are highly symmetric. This symmetry is due primarily to the use of a repetitive cell structure in the design of the LSI chip, which is an important consideration because of the substantial savings in lay-out time achieved by use of such cells. Further, there is a substantially reduced probability of art work error when repetitive cells are used instead of utilizing a custom approach to the art work of each cell. On the other hand, use of standard cells for all of the logic of a MOS LSI chip is very unlikely to optimally utilize the chip area. However, creative use of same repetitive cells in combination with custom art work for other sections of a chip may provide an optimum topology which will make possible a high chip yield from each substrate wafer, provide for good circuit electrical performance, and require a minimal amount of silicon substrate per chip.

A very high level of creativity is required of the chip architect in designing MOS LSI chip circuitry because of the layout constraints for state-of-the-art manufacturing processes. For example, for self-aligned silicon gate MOS manufacturing processes, the major constraints are the minimum width and spacings of the diffused regions, the minimum size required for preohmic openings and the spacings required from the edge of the peripheral preohmic openings to the edge of the diffused regions, the minimum width and spacing of polycrystalline silicon lines and the fact that such lines cannot cross over diffused regions, the minimum width and spacing between metal lines, and the fact that conductors in the same layer or in uninsulated adjacent layers cannot cross over like conductors. The high amount of capacitance associated with diffused regions and the resistance of both diffused lines and polycrystalline silicon lines (and to a lesser extent of metal lines) provide further constraints on the chip architect. For logic circuits which may be characterized as random logic designs, such as that of the subject invention, a large number of interconnection lines between sections of logic circuitry are required, and the very large number of possibilities for routing the various kinds of conductors to the various required sections of the chip takes the ingenuity of the most competent chip topology designer and the capacity of the most sophisticated computer routing programming available. Computer aided design (CAD) programs have been applied to computerize random logic MOS LSI layouts for a number of years. However, CAD programs have been successful only to the extent that they provide rapid prototype circuit designs having rather mediocre performance and producing uneconomically large semiconductor chips. It is well established that the CAD programs currently available do not come close to matching human ingenuity in providing MOS LSI chip architectures for minimized logic designs which provide optimum performance while utilizing minimal substrate area. The exercise of a high level of creativity in the design of MOS LSI chips thus results in economic reward of substantial measure.

While the invention has been described with reference to a preferred embodiment thereof, those skilled in the art will recognize that changes in form and placement of parts may be made to suit various requirements within the scope of the invention.

We claim:
1. A metal oxide semiconductor (MOS) chip for a disk memory controller circuit for coupling to external circuitry including a host processor and a buffer memory, said external circuitry having signal lines including a parallel data bus, said chip for transferring data between an external disk memory having a disk and the processor or the buffer memory, said chip comprising:
  (a) chip buffer circuitry adapted to couple the chip to the signal lines of the external circuitry, said buffer circuitry including tristate data input/output (I/O) buffer circuitry for coupling the chip to the external data bus;
  (b) data I/O buffer control circuitry for controlling the enabling of the tristate data I/O buffer circuitry;
  (c) a microcontroller for controlling the functions of the chip;
  (d) a register file coupled to the microcontroller and the data I/O buffer circuitry for storing control information received from the processor;
  (e) a read-only-memory (ROM) coupled to the microcontroller, having memory locations for storing program instructions used by the microcontroller;
  (f) drive control and unit select registers coupled to the microcontroller and the chip buffer circuitry for latching disk memory control information and disk memory select information;
  (g) shift registers coupled to the chip buffer circuitry and the microcontroller for converting parallel data received from the processor or the buffer memory to serial data and for converting serial data from an external disk memory to parallel data;
  (h) error checking circuitry coupled to the chip buffer circuitry and the shift registers, for detecting transmission errors in the data read from an external disk memory; and
  (i) disk synchronization circuitry for synchronizing the operations of the chip with the rotational speed of the disk;
  wherein the chip buffer circuitry forms a quadrilateral outer framework on the chip, and the data I/O buffer circuitry forms a first side of the quadrilateral outer framework; the data I/O buffer control circuitry is disposed between first and second corners of the chip buffer circuitry adjacent to the data I/O buffer circuitry; a first portion of the microcontroller is disposed adjacent to the data I/O buffer control circuitry and along a part of a second side of the chip buffer circuitry; the drive control and unit select registers are disposed adjacent to the first portion of the microcontroller and along a third side and within a third corner of the chip buffer circuitry; the ROM is disposed along a part of a fourth side of the chip buffer circuitry; a second portion of the microcontroller is disposed adjacent to the ROM, the first portion of the microcontroller and the drive control and unit select registers and within a fourth corner of the chip buffer circuitry; a third portion of the microcontroller is disposed adjacent to the ROM and the first portion of the microcontroller and along the fourth side of the chip buffer circuitry; the disk synchronization circuitry is disposed adjacent to the third portion of the microcontroller and along the fourth side of the chip buffer circuitry; the shift registers are disposed adjacent to and between the disk synchronization circuitry and the data I/O buffer control circuitry and along a part of the fourth side of the chip buffer circuitry; the third portion of the microcontroller is further disposed adjacent to the data I/O buffer control circuitry and the shift registers; the error checking circuitry is disposed between the first and third portions of the microcontroller and adjacent to the data I/O buffer control circuitry; and the register file is disposed between the first and third portions of the microcontroller and adjacent to the error checking circuitry.

2. The MOS chip of claim 1 wherein the first portion of the microcontroller comprises register file address decode logic disposed adjacent to the register file, for decoding address signals from the external processor or the microcontroller to select a particular register in accordance with the address signals.

3. The MOS chip of claim 2 wherein the microcontroller further comprises host processor data transfer control logic disposed adjacent to the data I/O buffer control circuitry and the register file address decode logic, for generating control signals to transfer data between the data buffer circuitry and the register file.

4. The MOS chip of claim 1 wherein the first portion of the microcontroller comprises disk drive interface and buffer memory interface control logic disposed along a part of the second side of the chip buffer circuitry and adjacent to the drive control and unit select registers, for monitoring the status of the disk drives and providing control information to the disk drives and further for providing and receiving control information to and from the host processor and the buffer memory.

5. The MOS chip of claim 1 wherein the second portion of the microcontroller comprises a state counter disposed along a part of the third side of the chip buffer circuitry and within the fourth corner of the chip buffer circuitry for providing a sequence of control signals to control the addressing of the ROM.

6. The MOS chip of claim 5 wherein the second portion of the microcontroller further comprises a tree decoder circuit disposed adjacent to and between the state counter and the ROM, for decoding the control signal outputs from the state counter to select a ROM memory location.

7. The MOS chip of claim 6 wherein the second portion of the microcontroller further comprises ROM output buffer circuitry disposed between the ROM and the first portion of the microcontroller, for storing the data supplied by the ROM from the memory location selected by the tree decoder circuitry.

8. The MOS chip of claim 1 wherein the third portion of the microcontroller comprises shift register control logic disposed adjacent to the ROM and the first portion of the microcontroller, for controlling the operation of the shift registers in accordance with the program instructions read from the ROM.

9. The MOS chip of claim 1 wherein the third portion of the microcontroller comprises internal data transfer control logic disposed adjacent to the disk synchronization circuitry and the shift registers on one side and the error checking circuitry and the register file on the other side, for controlling the transfer of data between the shift registers and the error checking circuitry and the register file.

10. The MOS chip of claim 9 wherein the third portion of the microcontroller further comprises a clock generator disposed adjacent to the disk synchronization circuitry and between the internal data transfer control logic and a part of the fourth side of the chip buffer circuitry.

11. The MOS chip of claim 1 wherein the area containing the register file further includes task registers for storing command execution information.

12. The MOS chip of claim 11 wherein the area containing the register file further includes data registers for latching up data transferred between the data I/O buffer circuitry and the shift registers.

13. The MOS chip of claim 12 wherein the area containing the register file further includes comparator logic for comparing the data latched in the data registers with the control information stored in the task registers.

14. A metal oxide semiconductor (MOS) chip for a disk memory controller circuit for coupling to external circuitry including a host processor and a buffer memory, said external circuitry having signal lines including a parallel data bus, said chip for transferring data between an external disk memory having a disk and the processor or buffer memory, said chip comprising:

chip buffer circuitry adapted to couple the chip to the signal lines of the external circuitry, said buffer circuitry including tristate data input/output (I/O) buffer circuitry for coupling the chip to the external data bus, wherein the chip buffer circuitry forms a quadrilateral outer framework on the chip and the data I/O buffer circuitry forms a first side of the quadrilateral outer framework;

data I/O buffer control circuitry disposed between the first and second corners of the chip buffer circuitry adjacent to the data I/O buffer circuitry, for controlling the enabling of the tristate data I/O buffer circuitry;

error checking circuitry disposed adjacent to the data I/O buffer control circuitry, for detecting transmission errors in the data read from an external disk memory;

data holding and shifting registers coupled to the chip buffer circuitry and disposed adjacent to the data I/O buffer control circuitry, for converting parallel data received from the processor or the buffer memory to serial data and for converting serial data from the external disk memory to parallel data;

a register file disposed adjacent to the error checking circuitry for storing control information received from the processor, said register file including task registers for storing command execution information, data registers for latching up data transferred to and from the external disk memory and a comparator circuit for comparing the data latched in the registers with the command information stored in the task registers;

register file address decode logic disposed adjacent to the register file and along a part of second side of the chip buffer circuitry, for decoding address signals to select a particular register in accordance with the address signals;

host processor data transfer control logic disposed along a part of the second side of the chip buffer circuitry and adjacent to the data I/O buffer control circuitry, the error checking circuitry and the register file address decode logic, for generating control signals to transfer data between the data I/O buffer circuitry and the register file;

disk drive interface and buffer memory interface control logic disposed along a part of the second side of the chip buffer circuitry and adjacent to the register file address decode logic, for monitoring the status of the disk drives and providing control information to the disk drives and further for providing and receiving control information to and from the host processor and the buffer memory;

drive control and unit select registers disposed adjacent to the disk drive interface and buffer memory interface control logic and along a third side and within a third corner of the chip buffer circuitry, for latching disk memory control information and disk memory select information;

a read only memory (ROM) disposed along a part of a fourth side of the chip buffer circuitry, and having memory locations for storing program instructions used by the chip;

a state counter disposed along a part of the third side of the buffer circuitry and within the fourth corner of the chip buffer circuitry for providing a series of control signals to control the addressing of the ROM;

a tree decoder disposed adjacent to and between the state counter and the ROM, for decoding the control signal outputs of the state counter to select a ROM memory location;

ROM output buffer circuitry disposed adjacent to and between the ROM and the disk drive interface and buffer memory interface control logic of the microcontroller, for storing the program instructions supplied by the ROM from the memory locations selected by the tree decoder circuitry;

holding and shifting register control logic disposed adjacent to the ROM and along a part of the fourth side of the chip buffer circuitry, for controlling the operation of the holding and shifting registers in accordance with the program instructions read from the ROM;

a clock generator disposed adjacent to the holding and shifting register control logic and along a part of the fourth side of the chip buffer circuitry;

disk synchronization circuitry disposed adjacent to the clock generator and along a part of the fourth side of the chip buffer circuitry, for synchronizing the disk memory controller chip with the rotational speed of the disk of the external disk memory;

internal data transfer control logic disposed adjacent to the clock generator, disk synchronization circuitry and the holding and shifting registers on one side and the error checking circuitry and the register file on the other side, for controlling the transfer of data between the holding registers and the error checking circuitry and the register file; and an interconnect area disposed adjacent to and between the register file and the disk drive interface and buffer memory interface control logic and disposed adjacent to and between the holding and shifting register control logic and the register file address decode logic, for interconnecting the register file, the register file address decode logic, the disk drive interface and buffer memory interface control logic, and the data holding and shifting register control logic.

* * * * *